United States Patent [19]

Safonnikov et al.

[11] Patent Number: 4,575,606
[45] Date of Patent: Mar. 11, 1986

[54] METHOD OF ELECTROSLAG WELDING AND FLUX

[76] Inventors: Anatoly N. Safonnikov, ulitsa Filatova, 1/22, kv. 78; Anatoly V. Antonov, ulitsa Kreisera Avrora 1, korpus 2, kv. 104, both of Kiev, U.S.S.R.

[21] Appl. No.: 468,054
[22] PCT Filed: Jun. 25, 1981
[86] PCT No.: PCT/SU81/00057
§ 371 Date: Feb. 15, 1983
§ 102(e) Date: Feb. 15, 1983
[87] PCT Pub. No.: WO83/00027
PCT Pub. Date: Jan. 6, 1983

[51] Int. Cl.$^4$ .............................................. B23K 25/00
[52] U.S. Cl. ...................................... 219/73.1; 219/73
[58] Field of Search ............... 219/73.1, 73, 73.2, 219/126

[56] References Cited

U.S. PATENT DOCUMENTS

| | | |
|---|---|---|
| 3,296,412 | 1/1967 | Waite et al. ................. 219/73.1 X |
| 3,627,592 | 12/1971 | Schmidt et al. ............. 219/73.1 X |
| 3,660,629 | 5/1972 | Nakai et al. ................. 219/73.1 |
| 3,869,592 | 3/1975 | Paton et al. ................. 219/73.1 |
| 4,086,463 | 4/1978 | Omori et al. ................. 219/73.1 X |
| 4,368,371 | 1/1983 | Dilthey et al. .............. 219/73.2 X |

FOREIGN PATENT DOCUMENTS

| | | |
|---|---|---|
| 2288832 | 2/1969 | U.S.S.R. |
| 260038 | 5/1970 | U.S.S.R. |
| 459315 | 3/1975 | U.S.S.R. |

OTHER PUBLICATIONS

A. N. Safonnikov, "Svarka metallov plastinchatym elektrodom", K. Technika, 1966, pp. 57–61.

Primary Examiner—C. L. Albritton
Assistant Examiner—Catherine M. Sigda
Attorney, Agent, or Firm—Lilling & Greenspan

[57] ABSTRACT

A method of electroslag welding consists in mounting parts to be welded with a required gap, assembling a forming device, introducing an electrode into the gap between the parts to be welded, filling the gap with a flux, setting a slag pool with subsequent melting of the electrode and the edges to be welded, and formation of the weld.

A flux for electroslag welding contains calcium fluoride, calcium oxide. According to the invention, the flux further contains calcium chloride, the ratio between calcium fluoride and calcium oxide being of 3:1.

1 Claim, 6 Drawing Figures

METHOD OF ELECTROSLAG WELDING AND FLUX

BACKGROUND OF THE INVENTION

1. Field of the Invention

The invention relates to electroslag welding with a consumable electrode and to a flux utilized in this method. The invention may be utilized in welding ingots of practically any thickness and made preferably from metals possessing high thermal conductivity, such as aluminum, copper etc.

2. Description of the Prior Art

Known in the art is a method of electroslag welding with a plate electrode (A. N. Safonnikov, "Svarka metallov plastinchatym elektrodom", K., Tekhnika, 1966, pp. 57–61).

The welding process is carried out as follows. Parts to be welded are mounted with a required gap. Then a forming device is assembled. A plate electrode mounted within an electrode holder is introduced into the gap space. A flux is charged so that the lower end of the electrode is immersed thereinto. The process of welding is initiated at a low feed speed of the plate electrode by means of short-time switchings. At the initial moment, there occurs melting of the electrical conductive flux serving as a fluxing agent for a main welding flux. As a slag pool is being formed, the flux designed for welding the parts is added in small portions. After the slag pool is formed, a stable electroslag process is established. The feed speed of the electrode is gradually increased and adjusted in accordance with a calculated speed. Prior to the termination of the welding process, due to the limited heat removal, at the edges of the parts being welded there is observed a considerable heating of edges in the upper portion of the weld butt, thereby resulting in a nonuniform penetration into the edges being welded, and in some cases even at incomplete penetrations, especially in the starting point of the weld.

The experiments have demonstrated that for the purpose of practicing the above method it is most expedient to utilize fluxes based on calcium fluoride. The main feature of these fluxes consists in that they form practically neutral slags. In the course of welding with the use of such fluxes the reliable protection of the weld pool is ensured and interaction between slag and metal is eliminated. Besides calcium fluoride, said fluxes further comprise various oxides. For instance, known in the art is a flux containing the following ingredients, percent by weight:

| | |
|---|---|
| $CaF_2$ | 65 to 75 |
| $CaO$ | 18 to 30 |
| $SiO_2$ | 2 |

However, the flux utilized in the above described method passesses inadequate activity to an oxide film, which results in the appearance of incomplete fusion in the welded joints even in the case where the penetration into the edges is sufficient.

SUMMARY OF THE INVENTION

The object of the invention is the provision of a method of electroslag welding and a flux providing for an increase in the quality of welded joints when welding parts having large cross-section by way of controlling the speed of electrode fusion in course of welding.

The object set forth in attained by a method of electroslag welding, wherein parts to be welded are mounted with a required gap, a forming device is assembled, an electrode is introduced into the gap between the parts to be welded, the gap is filled with a flux, a slag pool is set with subsequent melting of the electrode and the edges being welded, according to the invention, in the process of welding the zone of electrode melting is cooled.

The above method provides for a uniform and sufficient fusion of the welded edges when welding metals possessing high thermal conductivity. The effect is achieved due to an increase in the energy per unit length, resulting from a decrease in the melting rate of the electrode. The melting rate of the electrode is reduced by means of cooling the zone of electrode melting.

The zone of electrode melting is recommended to be cooled by means of application to the electrode substances decomposing with heat absorption.

The above modification of the method makes it possible to maintain a constant volume of the slag pool.

It is expedient to utilize alkali metal carbonates as the substances decomposing with heat absorption. Said modification of the method allows the welding process to be stabilized. It is most economical to utilize sodium carbonate as the alkali metal carbonate.

It is possible to utilize alkali-earth metal carbonates as the substances decomposing with heat absorption.

Said modification of the method allows a temperature of the electrode end to be maintained constant.

It is most economical to utilize calcium carbonate as the alkaliearth metal carbonate.

It is recommended to utilize substances containing water of crystallization as the substance decomposing with heat absorption.

Said modification of the method allows the electrode to be cooled effectively while utilizing a small amount of ingredients.

It is most economical to utilize borax as the substance containing water of crystallization.

It is expedient to carry out cooling of the zone of electrode melting by means of evaporation of low-boiling substances from the electrode surface, said substances being sprayed onto the electrode surface.

Said modification of the method allows the cooling rate of the electrode to be increased. "Low-boiling substances" hereinafter refers to such substances whose boiling point is lower than the melting temperature of the flux being used.

It is most expedient to apply a water-absorbing coating to the electrode surface prior to spraying low-boiling substances.

Said modification of the method provides for the possibility of the long-term storage of an electrode being prepared for welding without any decrease in the effectiveness of utilization thereof.

It is most economical to utilize water as the low-boiling substance.

It is possible to utilize a cellulose material as the coating.

Said modification of the method allows the rate of evaporation of low-boiling ingredients to be increased.

It is recommended to spray a mixture of a low-boiling substance and a bonding material onto the electrode surface.

Said modification of the method allows running-off of the low-boiling substances into the slag pool to be eliminated.

It is most economical to utilize a water glass as the bonding material.

Cooling the zone of the electrode melting can be carried out by means of introducing substances decomposing with heat absorption into the region of the slag pool adjacent the electrode.

Said modification of the method makes it possible to simplify carrying out preparatory operations.

Cooling the zone of the electrode melting is recommended to be carried out by blowing the electrode with a cooled gas.

Said modification of the method makes it possible to ensure cooling electrode portions disposed close to the surface of the slag pool.

Cooling the zone of the electrode melting is expedient to be carried out by bubbling regions of the slag pool which are adjacent the electrode with a cooled inert gas.

Said modification of the method allows constant slag composition to be ensured.

It is most economical to utilize argon as the inert gas.

Cooling the zone of the electrode melting is recommended to be carried out by introducing substances soluble in the slag with heat absorption into regions of the slag pool adjacent the electrode.

Said modification of the method makes it possible to ensure stability of the welding process.

It is most economical to utilize calcium oxide as the substance soluble in the slag with heat absorption.

Cooling the zone of the electrode melting is recommended to be carried out by feeding a pressurized cooled gas through longitudinal ducts provided in the electrode, said gas being discharged from the electrode through transverse ducts formed on the electrode side surface and communicating with the longitudinal ducts.

Said modification of the method allows the process of cooling the electrode to be intensified.

The object set forth is attained by a flux containing calcium fluoride and calcium oxide and, according to the invention, further contains calcium chloride, the ratio between calcium fluoride and calcium oxide being of 3:1.

Said flux is characterized by high process properties and by high activity to an oxide film.

To ensure stability of the welding process it is recommended that the flux contain ingredients taken in the following ratio, percent by weight:

| calcium fluoride | 15 to 30 |
| calcium oxide | 5 to 10 |
| calcium chloride | 60 to 80 |

BRIEF DESCRIPTION OF DRAWINGS

The invention is further explained in terms of detailed description of embodiments thereof with reference to the accompanying drawings, in which.

DESCRIPTION OF THE PREFERRED EMBODIMENTS

Figure 1:
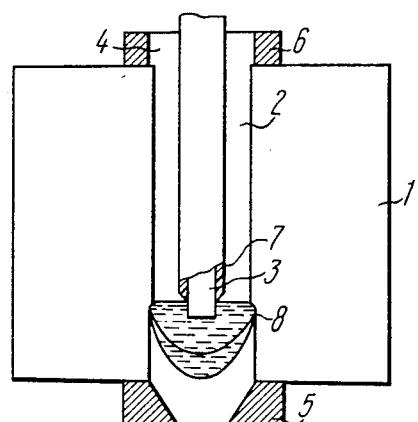
FIG. 1 shows schematically the process of electroslag welding of the invention.
Figure 2:
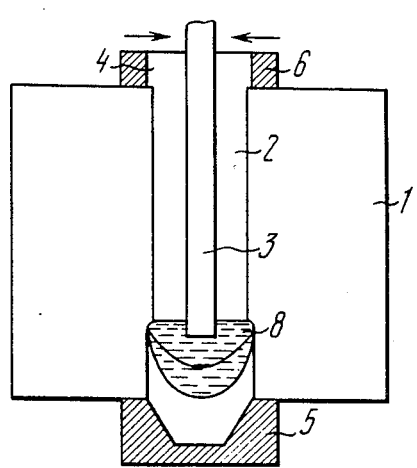
FIG. 2 shows schematically the process of electroslag welding of the invention the electrode being sprayed with low-boiling substances.

Specimens 1 to be welded are mounted on supports with a gap 2. Following this, a forming device is assembled on the specimens 1 to be welded, and an electrode 3 is installed. The forming device consists of moulds 4, a tray 5 and straps 6. The electrode 3 is disposed along the axis of the gap 2 between the edges to be welded of the specimens 1. The electrode surface is coated with substances 7 decomposing with heat absorption, such as alkali or alkali-earth metals carbonates (FIG. 1). Alongside with the above substances it is also possible to employ substances containing water of crystallization such as borax or Glauber's salt. The electrode surface can be also sprayed with low-boiling substances such as ethers and water (FIG. 2). Spraying operation is carried out after a hygroscopic coating, e.g. of a cellulose material, has been applied to the electrode. Such bonding materials as water glass may be introduced into the low-boiling substances prior to spraying operation. In this case the hygroscopic coating is not applied to the electrode.

The gap 2 is filled with a flux 7. The forming device and the electrode 3 are connected to different poles of a power supply, and a slag pool 8 is set in the tray 5. After the slag pool 8 has been set, welding current is switched on thereby resulting in the initiation of the welding process.

In the course of the welding process, substances applied to the electrode are decomposed or evaporated with heat absorption. The temperature of the electrode is lowered thereby resulting in a decrease in the melting rate of the electrode and in the uniform penetration of the welded edges of the specimens 1.

Figure 3:
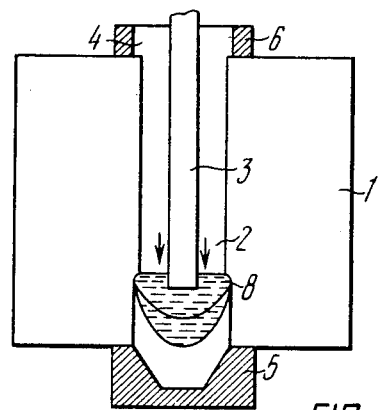
FIG. 3 shows schematically the process of electroslag welding of the invention, substances soluble in the slag being introduced into the regions of the slag pool adjacent the electrode.

Substances decomposing with heat absorption can be also introduced into the regions of the slag pool adjacent the electrode. Into said regions may be also introduced substances soluble in the slag with heat absorption, e.g. calcium oxide (FIG. 3). In so doing, the temperature of the slag pool adjacent the electrode is reduced and the melting rate of the electrode is decreased thereby providing for an uniform fusion of the welded edges of the specimens 1.

Figure 4:
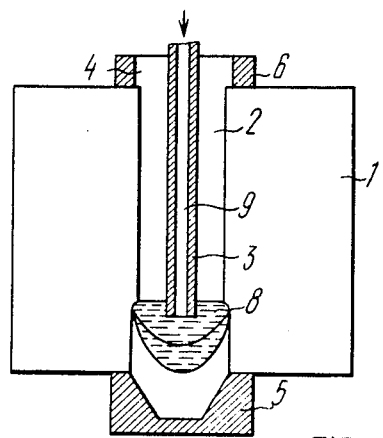
FIG. 4 shows schematically the process of electroslag welding of the invention the slag pool being bubbled with an inert gas.

The decrease in the temperature of the slag pool adjacent the electrode is also achieved by bubbling the regions of the slag pool being adjacent the electrode with a cooled inert gas, e.g. argon (FIG. 4). In this case, argon is fed under pressure through longitudinal ducts 9 provided in the electrode 3. In so doing, the electrode 3 is simultaneously cooled.

Figure 5:
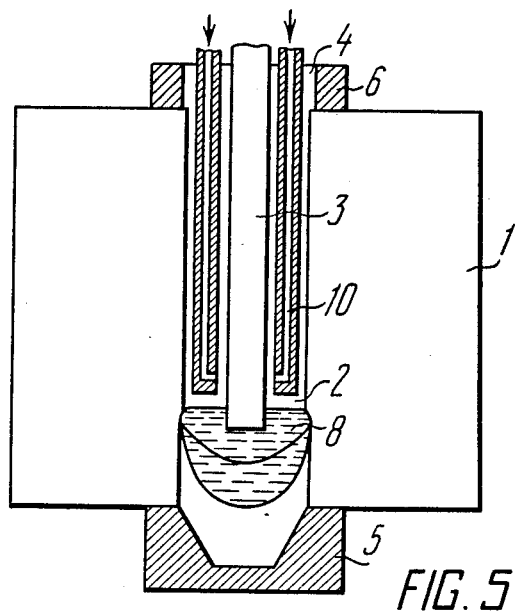
FIG. 5 shows schematically the process of electroslag welding of the invention, the electrode being blown with a cooled gas.
Figure 6:
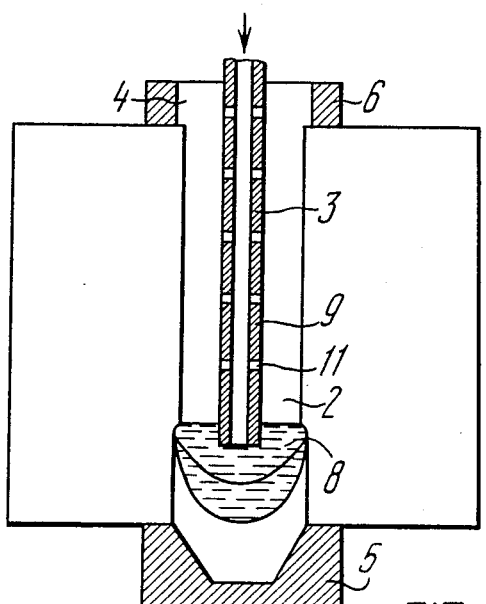
FIG. 6 shows schematically the process of electroslag welding of the invention, a cooled gas being blown through inner ducts of the electrode.

Cooling the electrode 3 can be also achieved by blowing same with a cooled gas (FIG. 5). In this case, nitrogen cooled down to its boiling point was fed through pipes 10, said nitrogen ensuring cooling of the electrode 3. The electrode may be also cooled by supplying a cooled gas, e.g. nitrogen, under pressure in the course of welding into the longitudinal ducts 9 of the electrode 3, said gas being removed from the longitudinal ducts 9 of the electrode 3 through transverse ducts 11 before it reaches the slag pool (FIG. 6).

The flux utilized in said method contains calcium fluoride, calcium oxide, and calcium chloride taken in the following ratio, percent by weight:

| | |
|---|---|
| calcium fluoride | 15 to 30 |
| calcium oxide | 5 to 10 |
| calcium chloride | 60 to 80 |

The ratio between calcium fluoride and calcium oxide is 3:1.

EXAMPLE 1

Aluminum specimens were welded. The specimens to be welded, having a cross-section of 50×360 mm, were mounted with a gap of 60 mm. Following this, a forming device and an aluminum electrode were mounted.

Decahydrate of sodium carbonate was applied to the electrode surface. The gap between the edges to be welded was filled with a flux of the following composition, percent by weight:

| | |
|---|---|
| calcium fluoride | 15.0 |
| calcium oxide | 5.0 |
| calcium chloride | 80.0 |

After the slag pool had been set, there occured fusion of the edges being welded and of the electrode end. In the process of welding, decomposition of decahydrate of sodium carbonate with heat absorption and cooling of the electrode took place.

Welding was carried out at the following conditions:

| | |
|---|---|
| welding current ($I_w$) = | 3.0 ... 4.0 kA |
| no-load voltage ($U_{nl}$) = | 36.0 V |
| welding voltage ($U_w$) = | 32.0 ... 33.0 V |

As a result of welding, a high-quality weld was obtained, the depth of penetration being of 15 to 20 mm.

EXAMPLE 2

Aluminum specimens having a cross-section of 70×250 mm were welded. The specimens to be welded were mounted with a gap of 60 mm. Following this, a forming device and an aluminum electrode were mounted.

The gap between the edges to be welded was filled with a flux of the following composition, percent by weight:

| | |
|---|---|
| calcium fluoride | 24.0 |
| calcium oxide | 8.0 |
| calcium chloride | 68.0 |

In the course of welding, the electrode surface was sprayed with water whose evaporation provided for cooling thereof.

Welding was carried out at the following conditions:

| | |
|---|---|
| $I_w$ | 3.5 ... 4.5 kA |
| $U_{nl}$ | 36.0 V |
| $U_w$ | 31.0 ... 32.0 V |

As a result of welding, a high-quality weld was obtained, the depth of penetration being of 10 to 15 mm.

EXAMPLE 3

Copper specimens having a cross-section of 100×100 mm were welded. The specimens to be welded were mounted with a gap of 80 mm. Following this, a forming device and a copper electrode were mounted. Pipes for supplying a cooling gas were located near the electrode.

The gap between the edges to be welded was filled with a flux of the following composition, percent by weight:

| | |
|---|---|
| calcium fluoride | 30.0 |
| calcium oxide | 10.0 |
| calcium chloride | 60.0 |

In the course of welding, the electrode was cooled with nitrogen cooled down to the boiling point thereof. Welding was carried out at the following conditions:

| | |
|---|---|
| $I_w$ | 3.0 ... 6.5 kA |
| $U_{nl}$ | 36.0 ... 45.0 V |
| $U_w$ | 30.0 ... 40.0 V |

As a result of welding, a high-quality weld was obtained, the depth of penetration being of 15 to 40 mm.

EXAMPLE 4

Aluminum specimens having a cross-section of 100×100 mm were welded. The specimens were mounted with a gap of 60 mm. Following this, a forming device and an aluminum electrode were mounted, said electrode being provided with longitudinal ducts of 6 mm in diameter, said ducts communicating with the atmosphere through transverse ducts of 1 mm in diameter.

The gap between the edges to be welded was filled with a flux of the following composition, percent by weight:

| | |
|---|---|
| calcium fluoride | 15.0 |
| calcium oxide | 5.0 |
| calcium chloride | 80.0 |

After the slag pool had been set, there occured fusion of the edges being welded and of the electrode end.

In the process of welding, the longitudinal ducts of the electrode were supplied with nitrogen under a pressure of 0.5 atmg, said nitrogen being cooled down to the boiling point thereof, the nitrogen was removed through the transverse ducts before having reached the slag pool, thereby cooling the electrode.

Welding was carried out at the following conditions:

| | |
|---|---|
| $I_w$ | 4.5 ... 8.5 kA |
| $U_{nl}$ | 44.0 V |

-continued

| | |
|---|---|
| $U_w$ | 34.0 V ... 38.0 V |

As a result of welding, a high-quality weld was obtained, the depth of penetration being of 14 to 29 mm.

EXAMPLE 5

Aluminum specimens having a cross-section of 140×250 mm were welded. The specimens were mounted with a gap of 70 mm. Following this, a forming device and an electrode made from an aluminum-magnesium alloy were mounted, said electrode being provided with longitudinal ducts of 5 mm in diameter.

The gap between the edges to be welded was filled with a flux of the following composition, percent by weight:

| | |
|---|---|
| calcium fluoride | 15.0 |
| calcium oxide | 5.0 |
| calcium chloride | 80.0 |

After the slag pool had been set, there occured fusion of the edges being welded and of the electrode end. In the process of welding, cooled argon was supplied through the longitudinal ducts provided in the electrode, thereby carrying out bubbling of the slag pool adjacent the electrode.

Welding was carried out at the following conditions:

| | |
|---|---|
| $I_w$ | 6.0 ... 9.5 kA |
| $U_{nl}$ | 44.0 V |
| $U_w$ | 32.0 ... 37.0 V |

As a result of welding, a high-quality weld was obtained, the depth of penetration being of 12 to 34 mm.

EXAMPLE 6

Aluminum-magnesium alloy specimens having a cross-section of 140×250 mm were welded. The specimens to be welded were mounted with a gap of 70 mm. Following this, a forming device and an electrode made from an aluminum-magnesium alloy were mounted.

The gap between the edges to be welded was filled with a flux of the following composition, percent by weight:

| | |
|---|---|
| calcium fluoride | 21.0 |
| calcium oxide | 7.0 |
| calcium chloride | 72.0 |

After the slag pool had been set, there occured fusion of the edges being welded and of the electrode end.

In the process of welding, calcium oxide powder was continuously fed into the regions of the slag pool adjacent the electrode.

Welding was carried out at the following conditions:

| | |
|---|---|
| $I_w$ | 6.0 ... 9.0 kA |
| $U_{nl}$ | 44.0 V |
| $U_w$ | 33.0 ... 36.0 V |

As a result of welding, a high-quality weld was obtained, the depth of penetration being of 12 to 24 mm.

While the invention has been described herein in terms of the preferred embodiments, numerous variations and modifications may be made therein without departing from the invention as set forth in the appended claims.

The method of electroslag welding and flux are utilized in welding ingots of practically any thickness and produced mainly from metals having high thermal conductivity, such as aluminum, copper and other metals.

We claim:

1. A method of electroslag welding, comprising the steps of mounting the parts to be welded with a required gap, assembling a forming device, introducing an electrode into the gap between the parts to be welded, filling the gap with a flux, setting a slag pool with subsequent melting of the electrode and edges to be welded, and cooling the electrode in a zone of melting during welding, wherein cooling the zone of the electrode melting is carried out by supplying a pressurized cooled gas through longitudinal ducts provided in the electrode, the gas being discharged from the electrode through transverse ducts communicating with the longitudinal ducts and provided on the side surface of the electrode.

* * * * *